US012794068B2

(12) United States Patent
Cheon et al.

(10) Patent No.: US 12,794,068 B2
(45) Date of Patent: Nov. 10, 2026

(54) TRANSFERRING APPARATUS

(71) Applicant: Samsung SDI Co., Ltd., Yongin-si (KR)

(72) Inventors: Moonsoo Cheon, Yongin-si (KR); Suhan Yun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 500 days.

(21) Appl. No.: 18/452,380

(22) Filed: Aug. 18, 2023

(65) Prior Publication Data

US 2024/0313327 A1 Sep. 19, 2024

(30) Foreign Application Priority Data

Mar. 14, 2023 (KR) ........................ 10-2023-0033459

(51) Int. Cl.

| | |
|---|---|
| ***H01M 50/256*** | (2021.01) |
| ***B65G 43/08*** | (2006.01) |
| ***B65G 54/02*** | (2006.01) |
| ***H01M 50/22*** | (2021.01) |
| ***H02K 41/03*** | (2006.01) |

(52) U.S. Cl.
CPC .......... *H01M 50/256* (2021.01); *B65G 54/02* (2013.01); *H01M 50/22* (2021.01); *B65G 43/08* (2013.01); *H02K 41/031* (2013.01)

(58) Field of Classification Search
CPC .... H01M 50/256; H01M 50/22; B65G 54/02; B65G 43/08; H02K 41/031; H02K 41/033
USPC .......................................................... 198/805
See application file for complete search history.

(56) References Cited

U.S. PATENT DOCUMENTS

| | | | | |
|---|---|---|---|---|
| 5,918,510 A | 7/1999 | Uemura et al. | | |
| 6,348,746 B1 | 2/2002 | Fujisawa et al. | | |
| 9,008,831 B1 * | 4/2015 | Jacobs | B65G 47/52 700/214 | |
| 11,021,335 B2 | 6/2021 | Sinzenich et al. | | |
| 2015/0217887 A1 | 8/2015 | Jacobs et al. | | |
| 2022/0356902 A1 | 11/2022 | Gardner et al. | | |
| 2022/0388786 A1 | 12/2022 | Fujii et al. | | |
| 2022/0411196 A1 | 12/2022 | Das et al. | | |
| 2023/0291294 A1 * | 9/2023 | Wang | H02K 41/031 | |

(Continued)

FOREIGN PATENT DOCUMENTS

| | | |
|---|---|---|
| CN | 104682167 A | 6/2015 |
| CN | 212268606 U | 1/2021 |

(Continued)

OTHER PUBLICATIONS

Extended European Search Report issued in corresponding EP Application No. 23206814.8, dated Apr. 8, 2024, 7 pages.

(Continued)

*Primary Examiner* — James R Bidwell
(74) *Attorney, Agent, or Firm* — Womble Bond Dickinson (US) LLP

(57) ABSTRACT

A transferring apparatus includes: a frame; a track including a stator arranged along edges of the frame; a plurality of movers; and a controller. Each of the plurality of movers includes: a body extending around an edge of the stator; a pair of magnets on both sides of the body and facing an upper surface and a lower surface of the stator, respectively; and a seating block on an upper surface of the body and configured to support an object.

15 Claims, 9 Drawing Sheets

(56) References Cited

U.S. PATENT DOCUMENTS

| | | | | |
|---|---|---|---|---|
| 2023/0331496 | A1 | 10/2023 | Rawlyk | |
| 2024/0178778 | A1* | 5/2024 | Qian | H02K 11/215 |

FOREIGN PATENT DOCUMENTS

| | | | | | |
|---|---|---|---|---|---|
| CN | 214900483 | U | | 11/2021 | |
| CN | 217919920 | U | | 11/2022 | |
| GB | 2133757 | A | * | 8/1984 | B65G 54/02 |
| JP | 4094769 | B2 | | 6/2008 | |
| JP | 2022-187975 | A | | 12/2022 | |
| KR | 10-0468190 | B1 | | 5/2005 | |
| KR | 101531656 | B1 | * | 6/2015 | F16H 49/005 |
| KR | 10-1763983 | B1 | | 8/2017 | |
| KR | 10-2138321 | B1 | | 7/2020 | |
| WO | WO 2012/044734 | A1 | | 4/2012 | |
| WO | WO-2017203022 | A1 | * | 11/2017 | B65H 5/04 |
| WO | WO 2022/112210 | A1 | | 6/2022 | |

OTHER PUBLICATIONS

European Office Action issued in corresponding EP Application No. 23206814.8, dated Jun. 8, 2026, 6 pages.
Chinese Office Action issued in corresponding CN Application No. 202311507578.1, dated Jul. 24, 2026, 11 pages.
Korean Office Action issued in corresponding KR Application No. 10-2023-0033459, dated Jul. 16, 2026, 6 pages.

* cited by examiner

TRANSFERRING APPARATUS

CROSS-REFERENCE TO RELATED APPLICATION

This application claims priority to and the benefit of Korean Patent Application No. 10-2023-0033459, filed on Mar. 14, 2023, in the Korean Intellectual Property Office, the entire disclosure of which is incorporated herein by reference.

BACKGROUND

1. Field

Aspects of embodiments of the present disclosure relate to a transferring apparatus.

2. Description of the Related Art

Multiple processes are required to manufacture a battery pack, and to move various parts between the different processes, a turn table method or a shuttle method may be used. However, in the case of the turn table method or the shuttle method, the space for installing the necessary equipment is limited and it is difficult to add or change a process line due to concerns about wiring interference because of high-speed transfer in the facility.

A mobile phone pack and coin cell pack process using a battery pack and, in particular, a small battery cell, requires high productivity per battery pack, and a flexible process line design is desirable to accommodate new types of applications in a short cycle.

The related art described above includes information the inventor used to derive embodiments of the present disclosure and/or technical information acquired during the process of deriving the same. Thus, the above information is not necessarily a technique known to the general public prior to the filing of the present disclosure.

SUMMARY

Embodiments of the present disclosure include a transferring apparatus configured to use (or including) a linear motor system (LMS) such that it has an overall simplified structure and easier maintenance and repair.

However, the above aspects and features of the present disclosure are examples, and the scope of the present disclosure is not limited thereto.

Additional aspects and features of the present disclosure will be set forth, in part, in the description that follows and, in part, will be apparent from the description or may be learned by practice of the described embodiments.

According to an embodiment of the present disclosure, a transferring apparatus includes: a frame; a track including a stator arranged along edges of the frame; a plurality of movers; and a controller. Each of the plurality of movers includes: a body extending around an edge of the stator; a pair of magnets on both sides of the body and facing an upper surface and a lower surface of the stator, respectively; and a seating block on an upper surface of the body and configured to support an object The transferring apparatus may further include a stop protrusion in an inner portion of the body, and the stop protrusion may be configured to be selectively retracted into the inner portion of the body or to protrude from the inner portion of the body toward the stator according to whether or not a current is supplied to the stator.

The stop protrusion may include a pair of stop protrusions. A first one of the stop protrusions may be on an inner side surface of an upper portion of the body, and a second one of the stop protrusions may be on an inner side surface of a lower portion of the body and facing each other with the stator therebetween.

The pair of stop protrusions may not overlap each other.

The body may have a receiving groove on a surface of the body facing the stator into which the stop protrusion is received.

The stop protrusion may include: an elastic member supported on an inner side surface of the receiving groove; and a wedge at an end portion of the elastic member and facing the stator. When the stop protrusion is retracted into the receiving groove, the elastic member may be maintained in a compressed state.

The stator may have an insertion groove on a surface thereof facing the stop protrusion and corresponding to the wedge.

The mover may include an electromagnet and a control device for controlling the electromagnet. The stop protrusion may be retracted by a current supplied to the electromagnet when a current is supplied to the stator and the stop protrusion may protrude toward the stator when the current to the electromagnet is cut off in response to no current being supplied to the stator.

The controller may be configured to transmit a stop signal to the mover when the current is not normally supplied to the stator, and the mover may be configured to cut off the current to the electromagnet in response to receiving the stop signal.

The seating block may include a damper on a surface thereof facing an adjacent mover.

The damper may protrude beyond the body from a side surface of the seating block facing toward the adjacent mover.

The track further may further include a rail supported by the frame and arranged downwardly and apart from the stator, and the mover may further include a roller on a bottom surface of the body and contacting the rail.

The rail may have a support rib extending in a width direction at an upper end thereof, and the roller may be rotatably coupled to a support protruding downwardly from the bottom surface of the body and contacts the support rib.

The roller may include a pair of rollers respectively contacting both sides of the support rib.

The mover may have a mounting groove in an upper surface of the seating block and configured to receive the object.

A pair of mounting grooves may be spaced apart from each other in both sides of the mover in a moving direction of the mover, and the pair of mounting grooves may be configured to receive the object in a direction perpendicular to the moving direction of the mover.

In addition to the aforesaid details, aspects and features of the present disclosure will be clarified and expanded in the following drawings, claims, and detailed description.

BRIEF DESCRIPTION OF THE DRAWINGS

The above and other aspects and features of the present disclosure will be more apparent from the following description, taken in conjunction with the accompanying drawings, in which.

DETAILED DESCRIPTION

Figure 1:
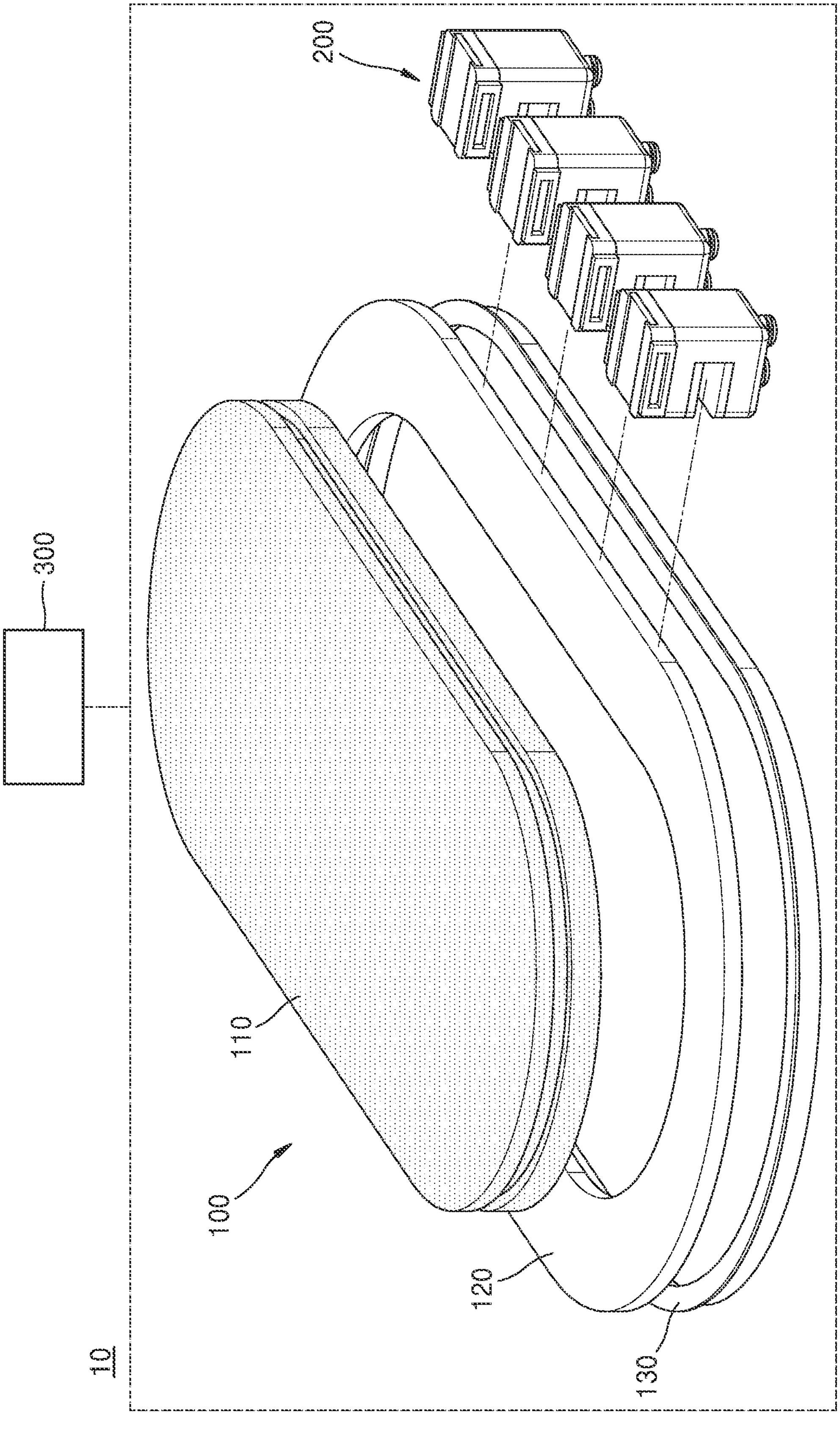
FIG. 1 is an exploded perspective view of a transferring apparatus according to an embodiment.

Reference will now be made, in detail, to embodiments, examples of which are illustrated in the accompanying drawings. The described embodiments may have different forms and should not be construed as being limited to the descriptions set forth herein. Accordingly, embodiments are merely described below, by referring to the figures, to explain aspects and features of the present description.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 2:
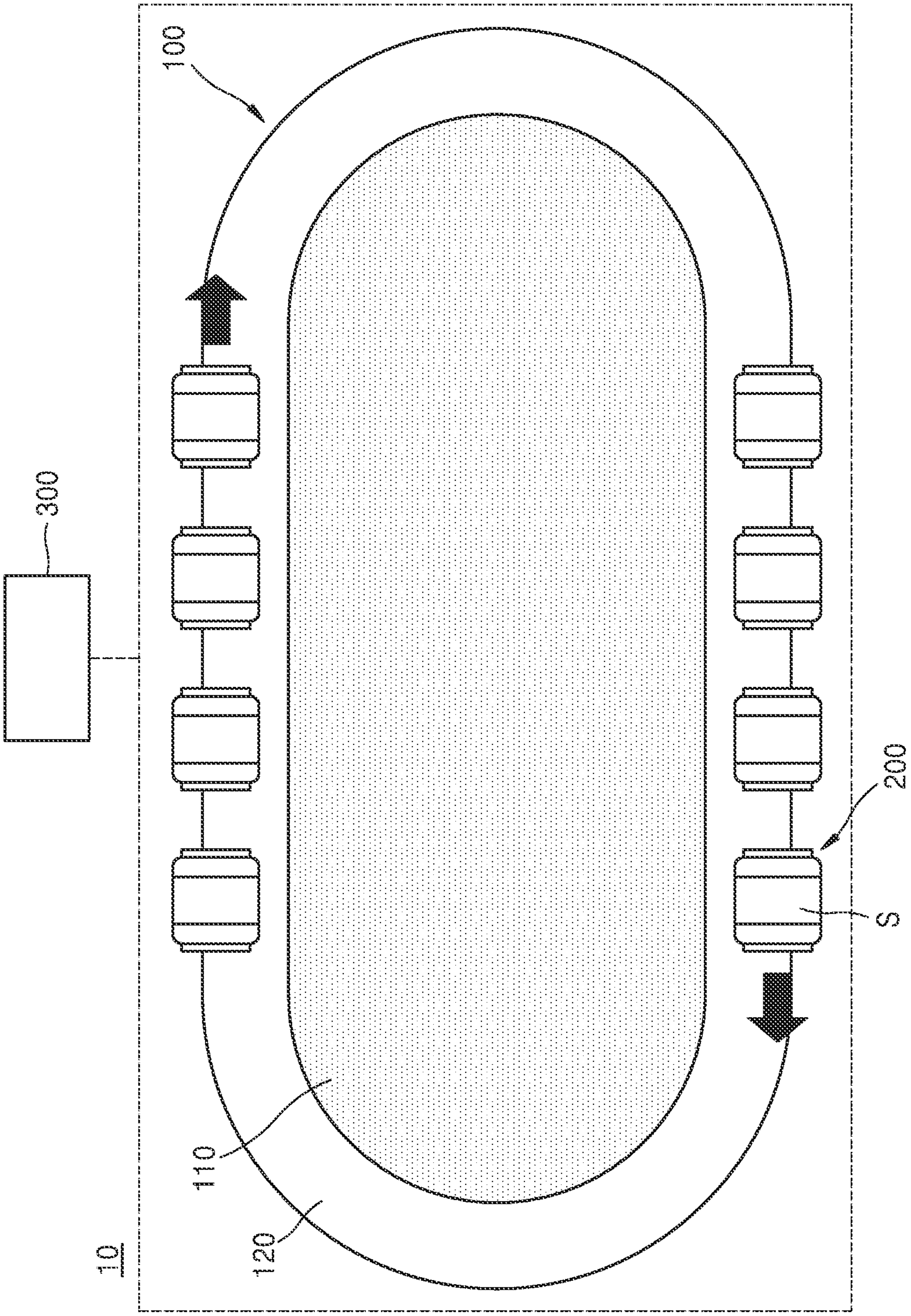
FIG. 2 is a plan view of a transferring apparatus according to an embodiment.
Figure 3:
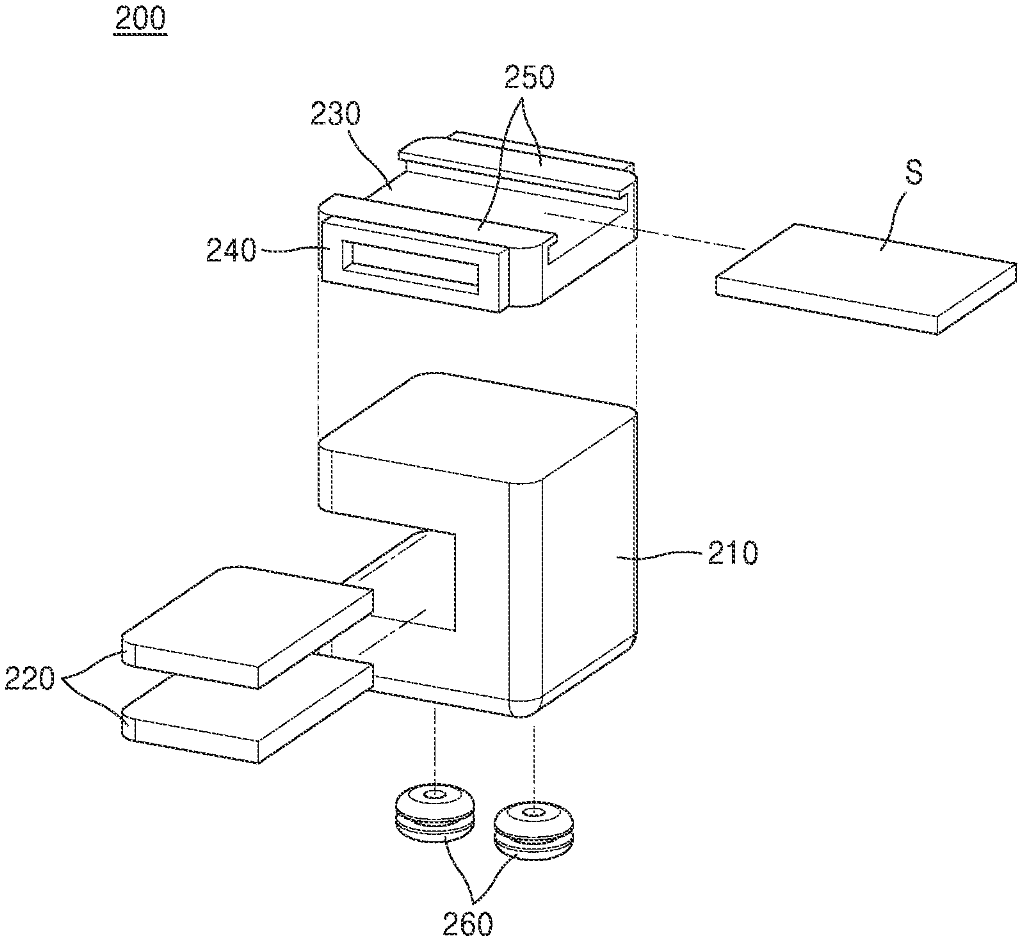
FIG. 3 is an exploded perspective view of a mover according to an embodiment.
Figure 4:
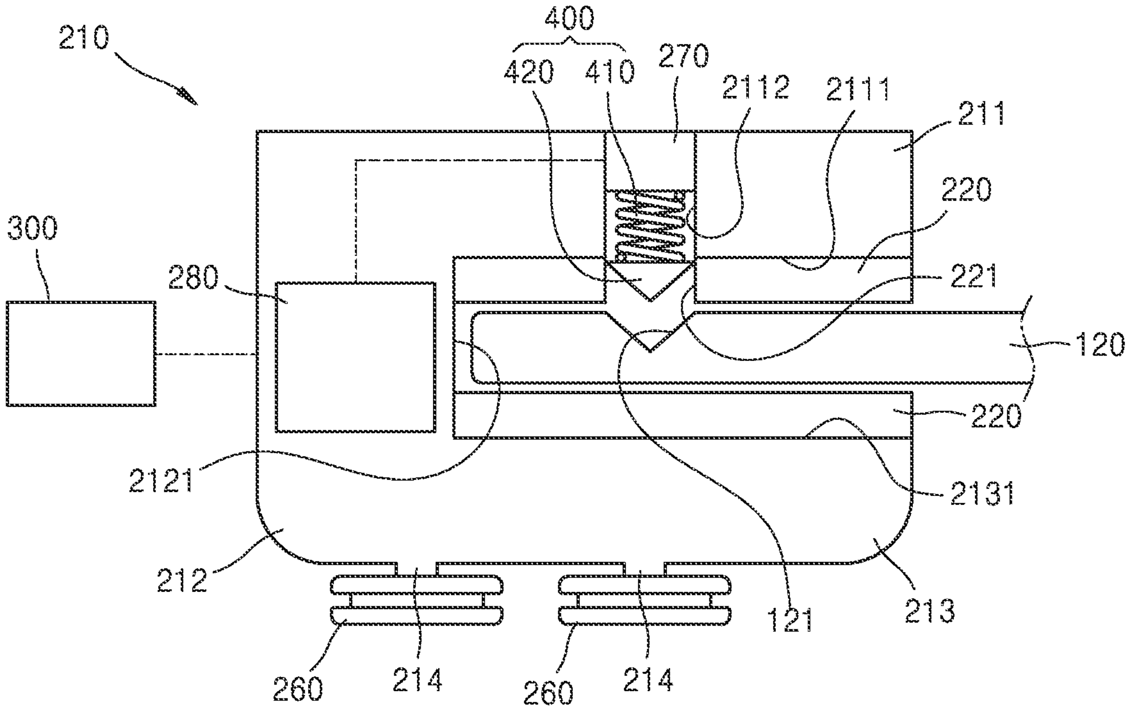
FIGS. 4 and 5 illustrate operation of a mover according to an embodiment.
Figure 5:
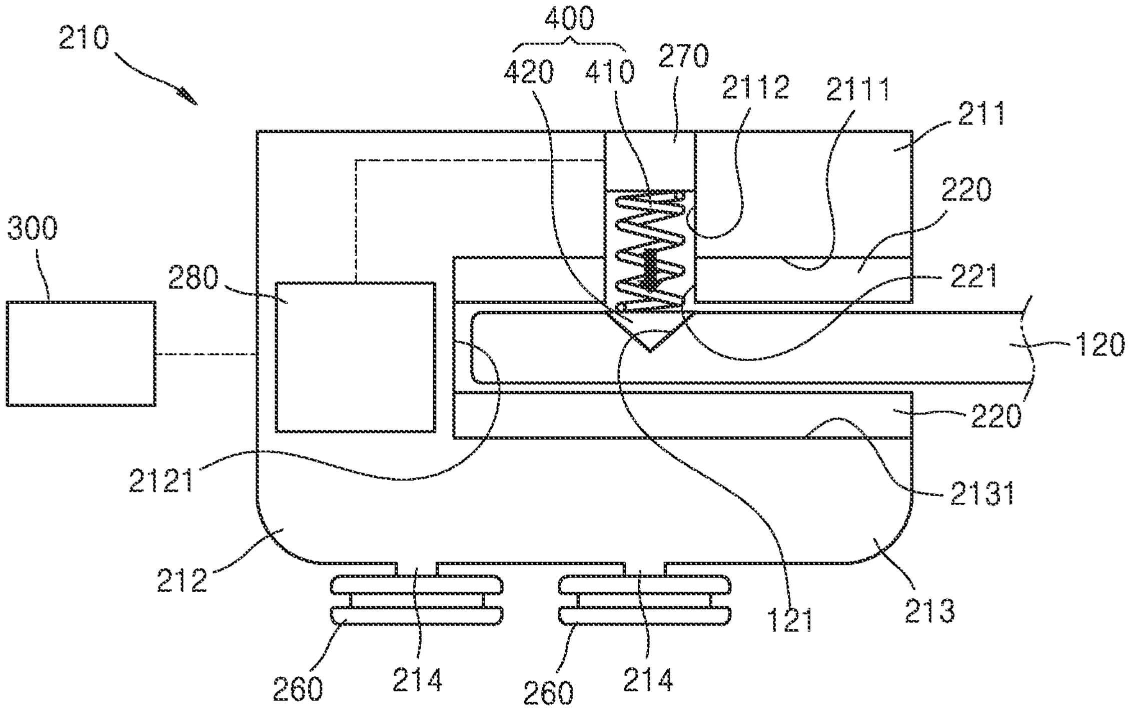
Figure 6:
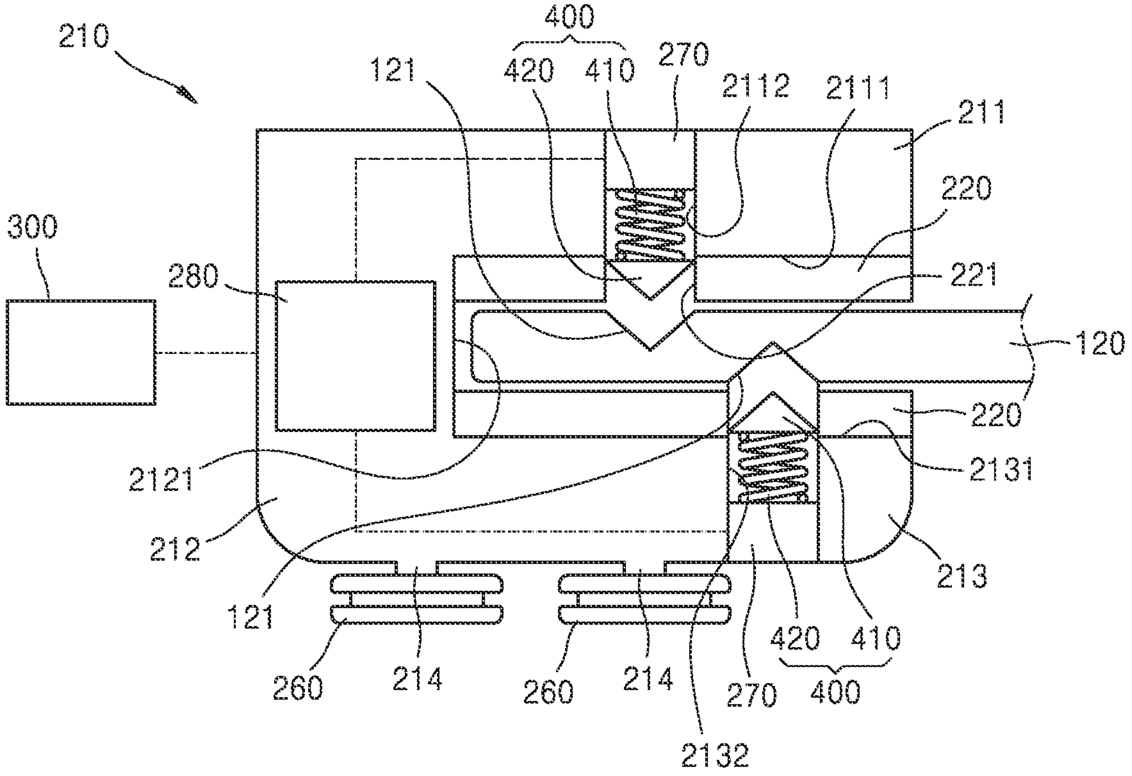
FIGS. 6 and 7 illustrate operation of a mover according to another embodiment.
Figure 7:
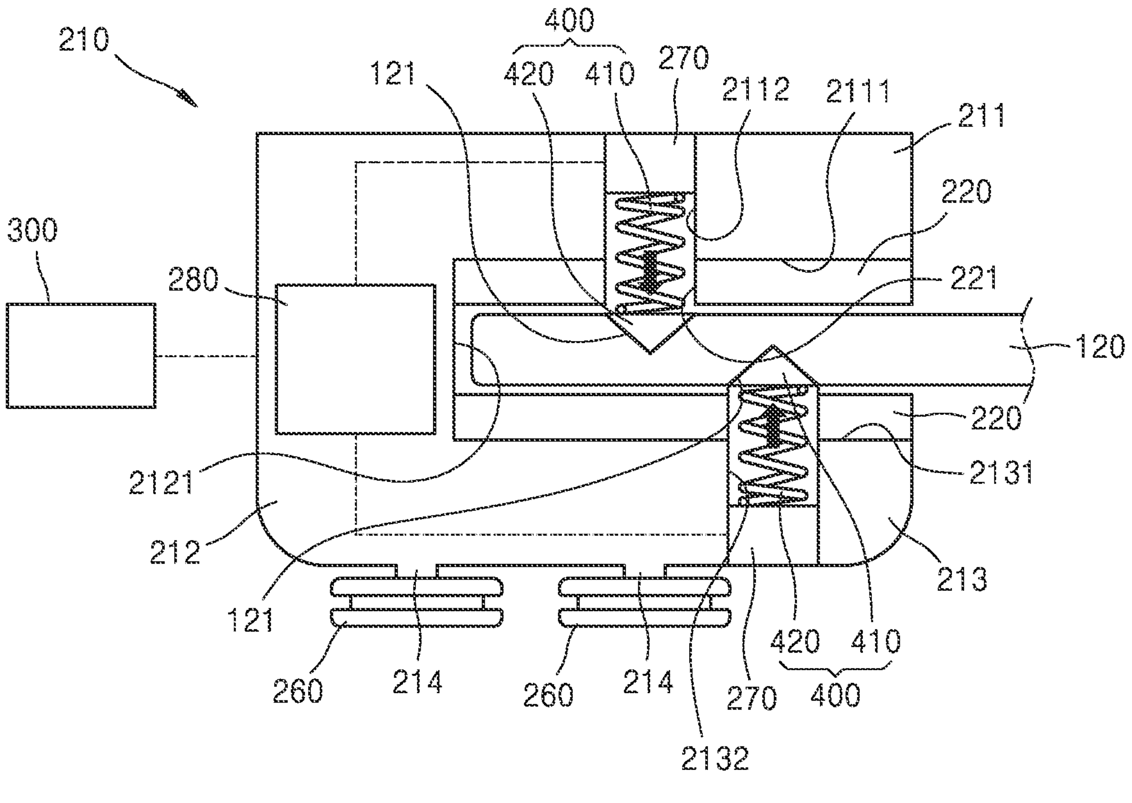
Figure 8:
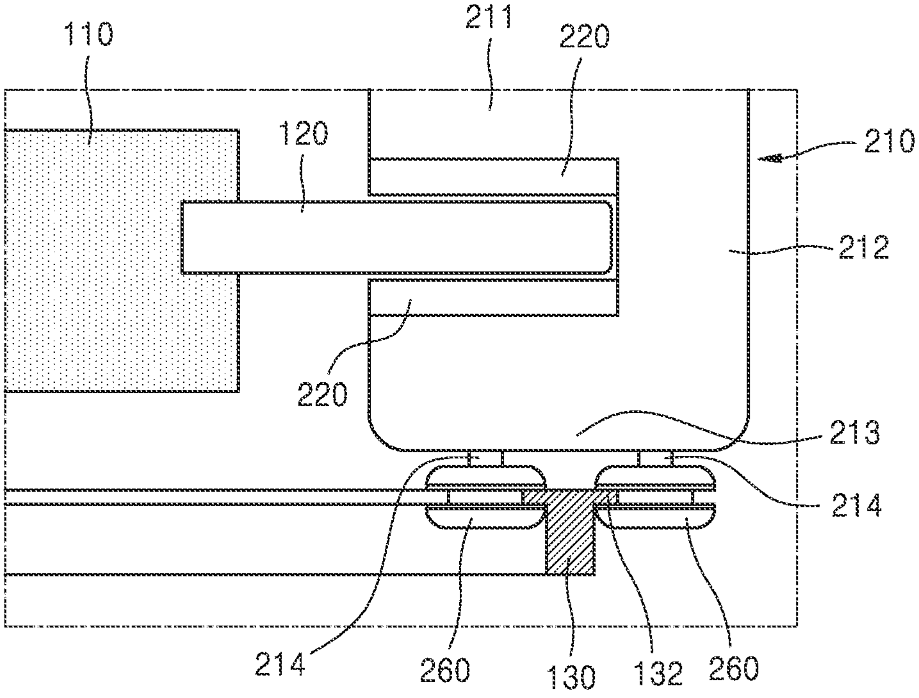
FIG. 8 illustrate a state in which a mover is mounted on a track, according to an embodiment.
Figure 9:
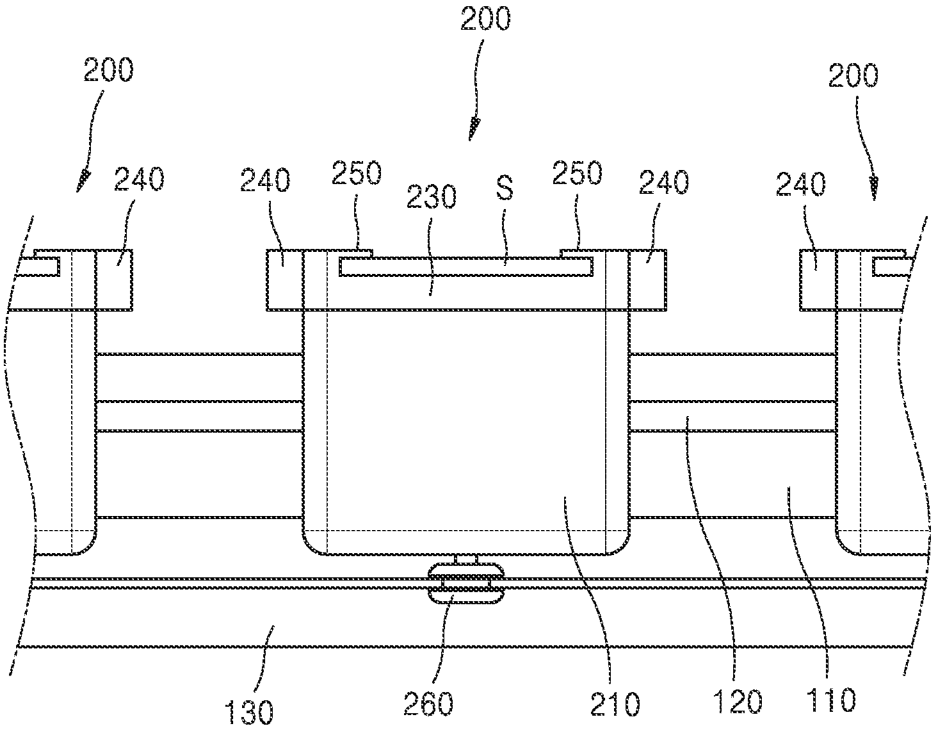
FIG. 9 is a side view illustrating a state in which a plurality of movers are mounted on a track, according to an embodiment.

FIG. 1 is an exploded perspective view of a transferring apparatus 10 according to an embodiment. FIG. 2 is a plan view of the transferring apparatus 10. FIG. 3 is an exploded perspective view of a mover 200 according to an embodiment. FIGS. 4 and 5 illustrate operation of the mover 200 according to an embodiment. FIGS. 6 and 7 illustrate an operation of the mover 200 according to another embodiment. FIG. 8 illustrates a state in which the mover 200 is mounted on a track 100 according to an embodiment. FIG. 9 is a side view illustrating a state in which a plurality of movers 200 are mounted on the track 100 according to an embodiment.

Referring to FIGS. 1 to 9, the transferring apparatus 10, according to an embodiment, may be used to (e.g., may be configured to) transfer an object S. The transferring apparatus 10 may be arranged in manufacturing equipment, for example, and may be used to transfer the object S from one process to another. The manufacturing equipment in which the transferring apparatus 10 is arranged is not limited and may be battery pack manufacturing equipment. Also, the object S may be a battery pack or a semi-finished product (or component) of a battery pack.

In an embodiment, the transferring apparatus 10 may be used in a facility for manufacturing a battery pack, for example, a coin cell pack for a wearable device or smart phone using a small battery cell. In addition, the object S may be a battery pack manufactured in the manufacturing facility or a product, such as a semi-finished product or a finished product, produced in a process of processing the battery pack. In addition, one transferring apparatus 10 or a plurality of transferring apparatuses 10 may be arranged in a manufacturing facility. In addition, the plurality of transferring apparatuses 10 may be arranged adjacent to each other and interlocked (or interconnected) with each other.

In an embodiment, the transferring apparatus 10 may be manufactured (or implemented) without a complicated wiring structure by implementing a transfer line by using a linear motor system (LMS). In addition, throughout this structure, lines may be easily changed or added according to the type and number of objects S, and maintenance and repair are easy.

In an embodiment, the transferring apparatus 10 may include a track 100, a mover 200, a controller 300.

The controller 300 and/or any other relevant devices or components according to embodiments of the present disclosure described herein may be implemented utilizing any suitable hardware, firmware (e.g., an application-specific integrated circuit), software, and/or a suitable combination of software, firmware, and hardware. For example, the various components of the controller 300 may be formed on one integrated circuit (IC) chip or on separate IC chips. Further, the various components of the controller 300 may be implemented on a flexible printed circuit film, a tape carrier package (TCP), a printed circuit board (PCB), or formed on a same substrate as the controller 300. Further, the various components of the controller 300 may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device or the functionality of a particular computing device may be distributed across one or more other computing devices without departing from the scope of the exemplary embodiments of the present disclosure.

The track 100 supports a plurality of movers 200 and, at the same time, provides a path through (or along) which the plurality of movers 200 move. As illustrated in FIG. 1, the track 100 may have a shape similar to a circle or an ellipse such that the plurality of movers 200 rotate and circulate in one direction. However, the shape of the track 100 is not limited thereto and may be appropriately selected according to the structure of the manufacturing facility in which the transferring apparatus 10 is installed, the specifications of the object S, and the manufacturing process. The track 100 may extend in one direction and may be configured such that the plurality of movers 200 reciprocate on the track 100.

In an embodiment, the track 100 may include a frame 110 and a stator 120.

The frame 110 supports other components of the track 100 and forms the overall shape of the track 100. As illustrated in FIG. 1, the frame 110 may be arranged in an inner portion of the track 100, and both ends of the frame 110 may be curved to have a curvature (e.g., a certain or predetermined curvature). In addition, the inner portion of the frame 110, from which both curved ends extend, may have a rectangular or square shape (e.g., the frame 110 may have an overall oval shape with a substantially rectangular center area). The frame 110 may have a groove continuously formed along the outer circumferential surface thereof, and the stator 120 may be inserted into the groove and supported by the frame 110.

The stator 120 has a shape corresponding to the frame 110 and is arranged along edges of the frame 110. As illustrated in FIG. 1, the stator 120 may have a flat plate shape with an empty inner portion (or area) and may be inserted into the frame 110. The stator 120 may be inserted into the groove formed in the outer circumferential surface of the frame 110. In a state in which the stator 120 is inserted into the frame 110, at least a portion of edges of the stator 120 protrudes toward the outside of the frame 110. As illustrated in FIG. 2, the plurality of movers 200 may be arranged and moved on (e.g., may move along) the protruding portion of the stator 120.

In an embodiment, the stator 120 may include a plurality of electromagnets including coils. Accordingly, when a current is supplied to the stator 120 from a power supply source by the controller 300, the electromagnets become magnetic, and repulsive and attractive forces are applied to magnets provided in the movers 200 to move the movers 200 along the track 100.

In an embodiment, the stator 120 may have an insertion groove 121. As illustrated in FIG. 4, the insertion groove 121 may be formed in one surface of the stator 120 to correspond to (e.g., to be aligned with) a stop protrusion 400, described below. The insertion groove 121 may have a shape corresponding to a wedge 420 of the stop protrusion 400. Accordingly, when the stop protrusion 400 protrudes and the wedge 420 is inserted into the insertion groove 121, the corresponding mover 200 may be stopped.

In an embodiment, the track 100 may further include a rail 130. As illustrated in FIG. 1, the rail 130 may have a shape corresponding to the stator 120 and has an empty inner portion (e.g., an empty inner area). The rail 130 may be supported under the track 100. In an embodiment, the rail 130 may be supported under the stator 120. The rail 130 allows the plurality of movers 200 moving along the stator 120 to move smoothly. In a state where the movers 200 are arranged to correspond to the stator 120, the rail 130 may be arranged below a bottom surface of the movers 200.

In an embodiment, the rail 130 may be arranged on (or under) a center of the mover 200. As illustrated in FIG. 8, a central axis of the mover 200 in a longitudinal direction and a central axis of the rail 130 in the longitudinal direction may be coaxially arranged. Accordingly, the mover 200 may move stably along the rail 130.

In an embodiment, an upper portion (e.g., an upper surface) of the rail 130 may have a support rib 132 protruding in a direction perpendicular to a travelling direction of the mover 200. As illustrated in FIG. 8, the support rib 132 may be arranged (or fitted) between a pair of rollers 260 of the mover 200, which will be described later, to contact the rollers 260. Both ends of the support rib 132 may be inserted between the pair of rollers 260. Thus, the mover 200 may stably move along the rail 130 while the rollers 260 are in contact with the support rib 132.

While supporting the object S, the mover 200 moves along the track 100 to transport the object S. As illustrated in FIG. 1, because the plurality of movers 200 are supported at one side of the track 100, the plurality of movers 200 may move along the track 100 and transport the object S. As illustrated in FIG. 2, while the plurality of movers 200 are aligned at one side of the track 100, the object S is seated on the movers 200. Thereafter, the mover 200 may move along the track 100 to the other side of the track 100, stop, and then transfer the object S to a next process.

In an embodiment, the mover 200 may include a body 210, a magnet 220, and a seating block 230 (see, e.g., FIG. 3).

The body 210 clamps the stator 120 so that the mover 200 moves along the track 100. As illustrated in FIGS. 1 to 3, the body 210 has a rectangular parallelepiped or regular hexahedral shape, and a portion of an inner side surface of the body 210 facing the stator 120 may be cut (e.g., may be open or may be a groove). In one embodiment, the body 210 may have a "C" shape having a groove on the inner side surface thereof overall. The stator 120 is inserted into the groove formed in the inner side surface of the body 210, and in this state, the mover 200 may move along the stator 120.

In an embodiment, the body 210 may have a first portion 211, a second portion 212 and a third portion 213.

As illustrated in FIG. 4, the first portion 211 is a block-shaped member arranged at an upper portion of the body 210 and extends toward the track 100. The first portion 211 has a first inner side surface 2111 facing an upper surface of the stator 120. One of a pair of magnets 220, to be described below, may be arranged on the first inner side surface 2111. In addition, the first portion 211 may include a first receiving groove 2112 into which the stop protrusion 400, to be described later, is inserted.

The second portion 212 is a block-shaped member extending downwardly from one side of (e.g., from one end of) the first portion 211. As illustrated in FIG. 4, while the stator 120 is inserted into the body 210, an end of the stator 120 may be spaced apart from (e.g., may face) a second inner side surface 2121 of the second portion 212. Also, the magnet 220 may not be separately arranged on the second inner side surface 2121.

The third portion 213 is a block-shaped member arranged parallel to the first portion 211 at one side (e.g., at an opposite side or end) of the second portion 212. As illustrated in FIG. 4, the third portion 213 is arranged to face the first portion 211 with respect to the second portion 212 and is spaced apart from the first portion 211 to partition an area in which the stator 120 is inserted. In addition, the third portion 213 has a third inner side surface 2131 facing a lower surface of the stator 120. The other one of the pair of magnets 220, to be described below, may be arranged on the third inner side surface 2131.

In an embodiment, the body 210 may include one or more supports 214 on a bottom surface of the body 210. As illustrated in FIGS. 4 and 9, a pair of supports 214 may be arranged on the bottom surface of the body 210, that is, on a lower surface of the third portion 213. The supports 214 have a bar shape extending straight downwardly and may be spaced apart from each other such that the rollers 260 are rotatably arranged on the supports 214, respectively. Accordingly, the support rib 132 of the rail 130 may be inserted between the pair of supports 214 and between the rollers 260.

The magnet 220 is arranged on at least one side of the body 210 to move the mover 200 by electromagnetic interaction with the track 100. As illustrated in FIGS. 3 and 4, the pair of magnets 220 may be arranged on one side and the other (e.g., the opposite) side of the body 210, and the stator 120 may be inserted therebetween. One of the pair of magnets 220 may be arranged on the first inner side surface 2111 of the first portion 211, and the other of the pair of magnets 220 may be arranged on the third inner side surface 2131 of the third portion 213. Accordingly, the pair of magnets 220 may be arranged to face the upper surface and the lower surface of the stator 120, respectively, in a state in which the stator 120 is inserted into the groove of the body 210.

While a current flows in the track 100, in an embodiment, the pair of magnets 220 may be maintained in a state in which the magnets are spaced apart from the upper surface and the lower surface of the stator 120. For example, the mover 200 may move while maintaining a non-contact state with the track 100.

In an embodiment, the magnet 220 may have a first protrusion hole (e.g., a first protrusion opening) 221. As illustrated in FIG. 4, when the stop protrusion 400 is arranged in the first portion 211 of the body 210, the first inner side surface 2111 of the first portion 211 of the pair of magnets 220 may have the first protrusion hole 221 at a portion corresponding to (e.g., aligned with) the first receiving groove 2112. The first protrusion hole 221 is formed through the magnet 220 in a thickness direction, and the stop protrusion 400 may protrude toward the stator 120 through the first protrusion hole 221 or may be inserted into the first portion 211 again.

In an embodiment, the mover 200 may include the seating block 230. The seating block 230 may be arranged on the body 210, and the object S is seated on the seating block 230. As illustrated in FIG. 3, the seating block 230 may be arranged on an upper surface of the body 210, and the object S may be arranged on the seating block 230. The seating block 230 may have a rectangular parallelepiped shape and may have a cross-sectional area equal to or smaller than that of the body 210.

In an embodiment, the mover 200 may include a damper 240. As illustrated in FIG. 3, dampers 240 may be arranged on each of both sides of the seating block 230 in a moving direction of the mover 200. When the mover 200 stops or accelerates for an unexpected reason while moving, it may collide with a neighboring mover 200; however, the damper 240 may absorb this impact. The damper 240 may be a deformable elastic member, such as rubber or spring.

As illustrated in FIG. 9, in a state where a current flows through the stator 120, the plurality of movers 200 may move side by side along the stator 120 while they are spaced apart from each other. If no current is supplied to the stator 120 at a desired timing while the plurality of movers 200 are moving, the electromagnets provided in the stator 120 may lose their magnetism and the plurality of movers 200 may move according to inertia and collide with each other. Here, as the damper 240 is provided on both sides of the seating block 230 in a traveling direction of the mover 200, even if neighboring movers 200 collide with each other, impact may be minimized.

In an embodiment, the damper 240 may protrude more outwardly than (e.g., may protrude beyond) the body 210. As illustrated in FIG. 9, in a state where the damper 240 is arranged on the seating block 230, an outer surface of the damper 240 may further protrude toward the neighboring mover 200 than an outer surface of the body 210 in a direction parallel to the moving direction of the mover 200. Accordingly, if the movers 200 collide with each other, parts of the movers 200 other than the damper 240 may not collide before the dampers 240 collide.

In an embodiment, the mover 200 may have mounting grooves 250. As illustrated in FIG. 3, a pair of mounting grooves 250 may be arranged in an upper surface of the mover 200. In an embodiment, the pair of mounting grooves 250 may be arranged in an upper surface of the seating block 230. The pair of mounting grooves 250 are spaced apart from each other to partition (or form) a space into which the object S is inserted.

The pair of mounting grooves 250 may be spaced apart from each other to correspond to a width of the object S. In addition, each mounting groove 250 may have (or may be formed by) an upper portion extending toward the inside (e.g., extending toward the adjacent mounting groove 250), and thus, the object S mounted in the mounting grooves 250 may be supported such that the object S is not unintentionally separated from the mounted state.

In an embodiment, the object S may be inserted between the pair of mounting grooves 250 in a direction perpendicular to the moving direction of the mover 200. As illustrated in FIG. 9, the mover 200 may move to the left or right, and the object S may be inserted into the mounting groove 250 in a direction perpendicular to the moving direction. Accordingly, the pair of mounting grooves 250 support both sides of the object S in the moving direction of the mover 200, thus preventing the object S from separating even when the mover 200 rapidly accelerates or decelerates.

One more (e.g., a third) mounting groove 250 may be provided on the upper surface of the seating block 230 to face a direction in which the object S is inserted. For example, in a state in which the pair of mounting grooves 250 are arranged spaced apart from each other on the seating block 230, the remaining one mounting groove 250 may be further arranged. Accordingly, while the mover 200 is moving, the object S may not escape inwardly toward the track 100.

In an embodiment, the mover 200 may include the roller 260. As illustrated in FIGS. 3 and 4, the pair of rollers 260 are arranged on the bottom surface of the body 210 and may be rotatably supported by the supports 214. Also, as illustrated in FIG. 8, the pair of rollers 260 may be arranged to contact both sides of the rail 130. The pair of rollers 260 clamp the support rib 132 of the rail 130, and as the mover 200 moves, the rollers 260 may roll while making contact with a side surface of the rail 130, thereby enabling the mover 200 move smoothly.

In an embodiment, the mover 200 may include an electromagnet 270 and a control device 280. As illustrated in FIG. 4, the electromagnet 270 may be arranged inside the body 210. In an embodiment, the electromagnet 270 may be arranged inside the first receiving groove 2112 to correspond to the stop protrusion 400. The control device 280 may selectively apply a current to the electromagnet 270 to magnetize it. When the transferring apparatus 10 operates normally, the control device 280 supplies a current to the electromagnet 270, and the magnetic electromagnet 270 holds the stop protrusion 400 within the first receiving groove 2112 (e.g., holds the stop protrusion 400 in a retracted state). Then, if no current is supplied at an unexpected time while the transferring apparatus 10 is in power failure, the control device 280 may cut off the current supplied to the electromagnet 270. As the magnetism of the electromagnet 270 dissipates, the protrusion 400 protrudes (e.g., extends) to stop the mover 200.

The control device 280 may be arranged at one side of the body 210 and communicates with the controller 300 to control the operation of the mover 200. When the mover 200 is to be stopped, the controller 300 may transmit a stop signal to the control device 280 causing the control device 280 to cut off the current supplied to the electromagnet 270 to make the stop protrusion 400 protrude.

The controller 300 transmits movement and stop signals to other components of the transferring apparatus 10 or controls the current supplied from a power supply source. The controller 300 may supply a current to the stator 120 such that the plurality of movers 200 move along the track 100. In other embodiments, the controller 300 may control the current supplied to the stator 120 such that the plurality of movers 200 are maintained in a stopped state such that the objects S may be mounted.

One or more stop protrusions 400 may be arranged on one side of the mover 200 and may be selectively (or reversibly) supported in the body 210 or protruding from the body 210 to stop the mover 200 according to whether or not a current is supplied to the stator 120. As illustrated in FIG. 4, the stop protrusion 400 may be inserted into (e.g., retracted into) the body 210 and, in an embodiment, into the first receiving groove 2112 in the first portion 211. The stop protrusion 400 may be arranged at a position corresponding to the electromagnet 270 and may protrude (e.g., may protrude from the first receiving groove 2112) depending on whether or not a current is supplied to the electromagnet 270.

In an embodiment, the stop protrusion 400 may remain retracted inside the body 210 when the transferring apparatus 10 operates normally, that is, when a current is normally supplied to the stator 120. In addition, when the transferring apparatus 10 does not operate normally, that is, when the current supplied to the stator 120 is abnormally cut off, the stop protrusion 400 may protrude from (e.g., may extend from) the inside of the body 210 to contact the stator 120. Accordingly, the mover 200 may stop.

In an embodiment, the stop protrusion 400 may include an elastic member 410 and the wedge 420.

The elastic member 410 has one end supported on the inside of the body 210, and the wedge 420 may be arranged at the other end of the elastic member 410. As illustrated in FIG. 4, the elastic member 410 may be supported on an inner side surface of the first receiving groove 2112 such that one end of the elastic member 410 faces the electromagnet 270. The elastic member 410 may include a conductive material and may be compressed or expanded according to the magnetism of the electromagnet 270.

When a current is supplied to the electromagnet 270 and the electromagnet 270 becomes magnetic, the elastic member 410 may be compressed toward the electromagnet 270, and accordingly, the wedge 420 may be located within (or retracted into or held within) the first receiving groove 2112 and the first protrusion hole 221. Then, when the current supplied to the electromagnet 270 is cut off by the control device 280 and the controller 300, the electromagnet 270 loses its magnetism, and the elastic member 410 is stretched (or expands) due to a restoring force. Accordingly, the wedge 420 may protrude through (or extend from) the first receiving groove 2112 and the first protrusion hole 221 to be accommodated in the insertion groove 121 in the stator 120.

The wedge 420 is supported at one end of the elastic member 410 and selectively contacts the stator 120 to stop the mover 200. The wedge 420 may have a downwardly and inwardly tapered shape.

The operation of the transferring apparatus 10 according to an embodiment will be described with reference to FIGS. 1 to 5 below.

First, the object S is seated in the plurality of movers 200. In this state, the controller 300 may control the current supplied to the stator 120 such that the plurality of movers 200 remain stationary. The object S may be inserted in a direction perpendicular to a direction in which the mover 200 moves and may be mounted in the mounting groove 250. In addition, the control device 280 provided in the mover 200 sends a current to the electromagnet 270 so that the electromagnet 270, which is then magnetic, supports (e.g., retracts) the stop protrusion 400 (see, e.g., FIG. 4).

When all the objects S are seated, the controller 300 controls the current supplied to the stator 120 such that the plurality of movers 200 move. When the plurality of movers 200 move along the track 100 and arrive at a designated position, the controller 300 stops the plurality of movers 200 by controlling the current supplied to the stator 120 again. Then, after a separate transfer robot or robot arm separates the object S from the movers 200, the controller 300 moves the plurality of movers 200 by controlling the current supplied to the stator 120.

While the movers 200 are moving, if an unexpected problem occurs in the current transmitted to the stator 120, such as a power outage, power cut, or overcurrent, in the transferring apparatus 10, the controller 300 may stop the movers 200. The controller 300 transmits a stop signal to the control device 280 of the mover 200, and the control device 280 cuts off the current supplied to the electromagnet 270. Accordingly, the electromagnet 270 loses its magnetism, and the elastic member 410, which is compressed, extends such that the wedge 420 protrudes downwardly (see, e.g., FIG. 5). The protruding wedge 420 is inserted into the insertion groove 121 in the stator 120, and the mover 200 is stopped by friction between the stop protrusion 400 and the stator 120.

Even if the stop protrusion 400 operates and the mover 200 does not completely stop, the damper 240 provided on the seating block 230 may relieve (or alleviate) an impact caused by a collision between the movers 200, thereby preventing damage to the mover 200.

In another embodiment, a plurality of stop protrusions 400 may be provided. The stop protrusions 400 may be arranged on an inner side surface of an upper portion of the body 210 and an inner side surface of a lower portion of the body 210 to face each other with the stator 120 therebetween. As illustrated in FIGS. 6 and 7, a first receiving groove 2112 and a third receiving groove 2132 may be formed in the first portion 211 and the third portion 213 of the body 210, respectively. In addition, the insertion groove 121 may be formed in the upper surface of the stator 120 to correspond to the first receiving groove 2112, and another insertion groove 121 may be formed in the lower surface of the stator 120 to correspond to the third receiving groove 2132. In addition, stop protrusions 400 are arranged inside the first receiving groove 2112 and the third receiving groove 2132, respectively, and a pair of electromagnets 270 are arranged to correspond to the pair of stopping protrusions 400.

When the controller 300 transmits a stop signal to the control device 280, the control device 280 controls the current supplied to the electromagnet 270 arranged to correspond to each stop protrusion 400. Accordingly, the electromagnets 270 lose its magnetism, and the elastic members 410, which are compressed, of each stop protrusion 400 protrude toward the stator 120 while extending due to the restoring force (see, e.g., FIG. 7). Then, each wedge 420 is inserted into the corresponding insertion groove 121 in the stator 120, and the mover 200 stops. Because the pair of stop protrusions 400 arranged to face each other are provided in the body 210 as described above, the mover 200 may be more stably and reliably stopped.

In an embodiment, the pair of stop protrusions 400 may be arranged not to overlap each other. As illustrated in FIGS. 6 and 7, the pair of stop protrusions 400 may be arranged apart from each other such that they do not overlap each other in a vertical direction. Thus, the pair of stop protrusions 400 and the stator 120 may contact each other at different points from each other. Accordingly, the mover 200 may be more stopped stably.

According to embodiments of the present disclosure, a transfer line is implemented by using an LMS, thereby simplifying configuration of the transferring apparatus without a complicated wiring structure while facilitating the change of lines and maintenance and repair thereof.

According to embodiments of the present disclosure, when a current is not supplied normally to the transferring apparatus, the stop protrusions may be controlled to rapidly stop the movers to prevent collision between the movers.

It should be understood that the embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the present disclosure as defined by the following claims and their equivalents.

What is claimed is:

1. A transferring apparatus comprising:
- a frame;
- a track comprising a stator arranged along edges of the frame;
- a plurality of movers, each of the plurality of movers comprising:
  - a body extending around an edge of the stator;
  - a pair of magnets on both sides of the body and facing an upper surface and a lower surface of the stator, respectively;
  - a seating block on an upper surface of the body and configured to support an object; and
  - a stop protrusion in an inner portion of the body, and
- a controller,
- wherein the stop protrusion is configured to be selectively retracted into the inner portion of the body or to protrude from the inner portion of the body toward the stator according to whether or not a current is supplied to the stator.

2. The transferring apparatus of claim 1, wherein the stop protrusion comprises a pair of stop protrusions, a first one of the stop protrusions being on an inner side surface of an upper portion of the body and a second one of the stop protrusions being on an inner side surface of a lower portion of the body and facing each other with the stator therebetween.

3. The transferring apparatus of claim 2, wherein the pair of stop protrusions do not overlap each other.

4. The transferring apparatus of claim 1, wherein the body has a receiving groove on a surface of the body facing the stator into which the stop protrusion is received.

5. The transferring apparatus of claim 4, wherein the stop protrusion comprises:
- an elastic member supported on an inner side surface of the receiving groove; and
- a wedge at an end portion of the elastic member and facing the stator,
- wherein, when the stop protrusion is retracted into the receiving groove, the elastic member is maintained in a compressed state.

6. The transferring apparatus of claim 5, wherein the stator has an insertion groove on a surface thereof facing the stop protrusion and corresponding to the wedge.

7. The transferring apparatus of claim 1, wherein the mover comprises an electromagnet and a control device for controlling the electromagnet, and
- wherein the stop protrusion is retracted by a current supplied to the electromagnet when a current is supplied to the stator and the stop protrusion protrudes toward the stator when the current to the electromagnet is cut off in response to no current being supplied to the stator.

8. The transferring apparatus of claim 7, wherein the controller is configured to transmit a stop signal to the mover when the current is not normally supplied to the stator, and wherein the mover is configured to cut off the current to the electromagnet in response to receiving the stop signal.

9. The transferring apparatus of claim 1, wherein the seating block comprises a damper on a surface thereof facing an adjacent mover.

10. The transferring apparatus of claim 9, wherein the damper protrudes beyond the body from a side surface of the seating block facing toward the adjacent mover.

11. The transferring apparatus of claim 1, wherein the track further comprises a rail supported by the frame and arranged downwardly and apart from the stator, and wherein the mover further comprises a roller on a bottom surface of the body and contacting the rail.

12. The transferring apparatus of claim 11, wherein the rail has a support rib extending in a width direction at an upper end thereof, and wherein the roller is rotatably coupled to a support protruding downwardly from the bottom surface of the body and contacts the support rib.

13. The transferring apparatus of claim 12, wherein the roller comprises a pair of rollers respectively contacting both sides of the support rib.

14. The transferring apparatus of claim 1, wherein the mover has a mounting groove in an upper surface of the seating block and configured to receive the object.

15. The transferring apparatus of claim 14, wherein a pair of mounting grooves are spaced apart from each other in both sides of the mover in a moving direction of the mover, and wherein the pair of mounting grooves are configured to receive the object in a direction perpendicular to the moving direction of the mover.

* * * * *